March 19, 1929.   R. W. RILEY   1,706,365
HAMBURGER COOKING STOVE
Filed June 5, 1928
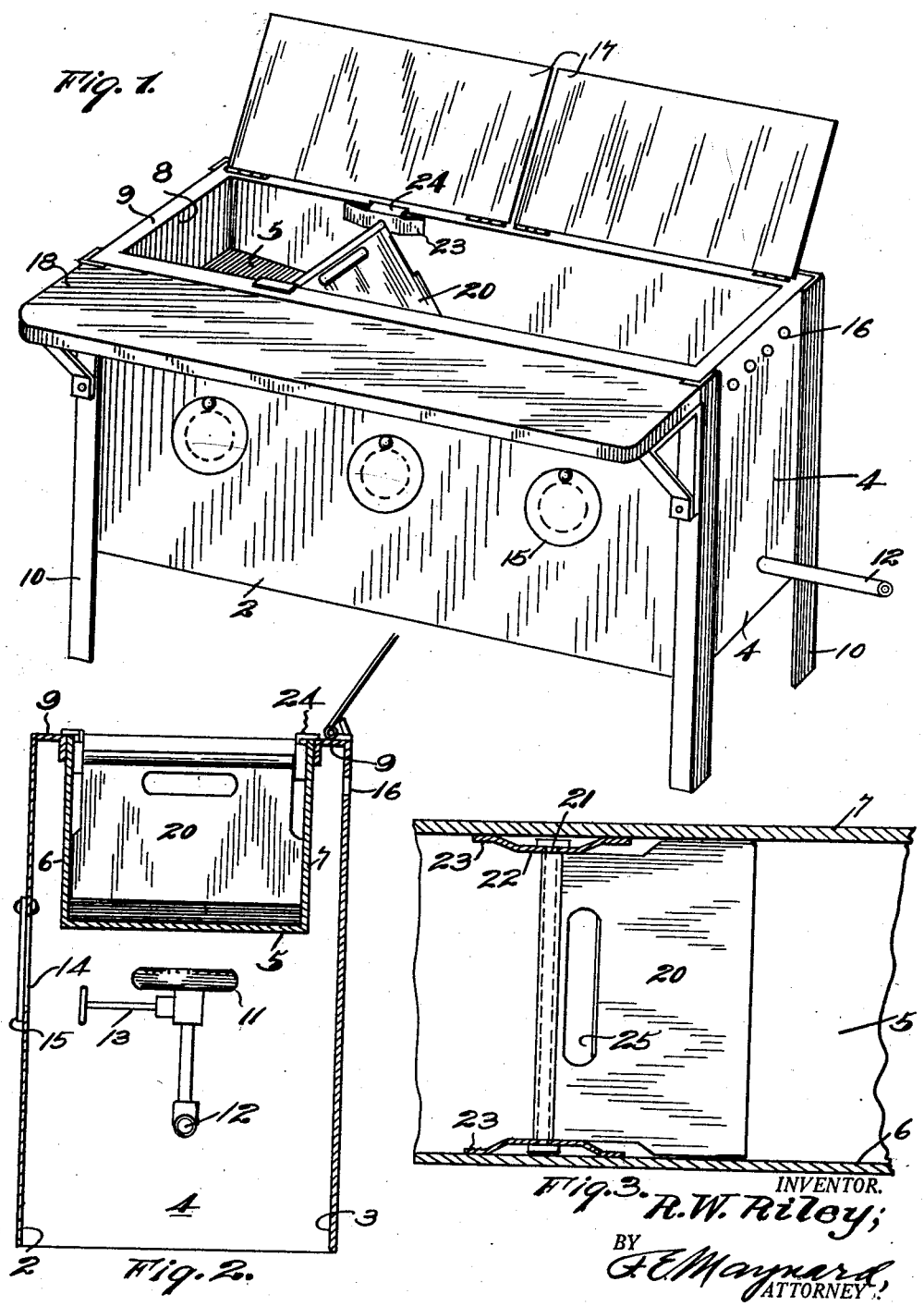

Patented Mar. 19, 1929.

1,706,365

UNITED STATES PATENT OFFICE.

ROBERT W. RILEY, OF LOS ANGELES, CALIFORNIA.

HAMBURGER-COOKING STOVE.

Application filed June 5, 1928. Serial No. 282,950.

This invention relates to cooking ranges and more especially to a stove for cooking the prepared meat batch employed in the manufacture of Hamburger sandwiches now generally sold at amusement and beach resorts, and at lunch and sandwich stands established along highways.

It is an object of the present invention to facilitate the cooking of the Hamburger meat batches and to maintain in a hot condition the cooked batch ready for instant service on demand.

A further purpose is to provide a stove of this character in which there is a cooking pan having upright walls surrounded by a casing forming a narrow hot air chamber for the intimate passage of hot air from burners to the side walls of the stove pan so that the latter are efficiently heated with an economy of gas consumption.

An additional object is to provide a stove of this character with a front making-up shelf and a plurality of lids or covers which may be severally raised or left lowered to serve as warming plates for made-up sandwiches.

It is a desideratum to provide means for the convenient dragging or shifting of the cooked batch of meat from the effective cooking end of the pan to a reserve or hot plate end and at the same time to constitute a partition separating a cooked batch of Hamburger from a fresh cooking batch, and to provide means coordinate to the lids or covers whereby to form a substantially separate closed chamber at either the cooking end or the hot plate end of the stove.

A further object is to provide a cooking stove which is of few and simple parts all of which are readily accessible for adjustment and cleaning so as to be kept in a thoroughly sanitary condition.

Other objects, advantages and features of construction and combination, and details of means will be made manifest in the ensuing description of the herewith illustrative embodiment; it being understood that modifications, variations and adaptations may be resorted to within the spirit, scope and principle of the invention as it is more directly claimed hereinafter.

Figure 1 is a perspective of the stove; showing the covers in upturned position.

Figure 2 is a vertical cross-section of the stove.

Figure 3 is a horizontal, longitudinal section showing the adjustable scraping partition, in plan.

In its illustrated form the stove includes a front panel 2 and a rear panel 3 and end panels 4 constituting an outer casing around an inner cooking pan shown here as having a flat bottom 5 having a longitudinal inclination from end to end of the stove. The bottom is provided with front and rear walls 6—7 and end walls 8 all of which are spaced inwardly from the outer casing so as to form rather narrow hot air spaces beneath a marginal top frame 9.

The casing structure extends considerably below the lowest point of the cooking pan and is preferably supported on elevating corner legs 10 here shown as in the form of angle iron members secured in overlapping position on the corners of the casing. The elevation of the casing allows fresh air to pass upwardly to burners 11 of which a series is connected to a supply pipe 12; each burner having its own valve 13 to regulate heat under the adjacent portion of the inclined bottom 5 of the pan. For convenience of access a front panel 2 is provided with a series of hand-holes 14 adjacent to the valves 13 and being covered by movable closures 15.

For economy of fuel it is desirable to conduct the hot gases upwardly along the sides and ends of the cooking pan so that this is efficiently heated not only on the bottom but on its sides and ends as well. This effect is obtained by forming the hot air chambers around the pan walls. Circulation is obtained and established by providing small outlet vent holes 16 in the end and rear panels of the stove casing.

On the top of the stove there is hingedly mounted a set of plane covers 17 adapted to be lowered onto the top frame 9. Thus either of the covers can be lifted for access to the pan without disturbing the other and the covers can be utilized as hot plates for prepared Hamburger sandwiches.

To increase facility of the stove there is provided along the front thereof a shelf 18 useful to receive batches of uncooked meat and also serving as a table for the making-up of the sandwiches.

An important feature of the present invention is to provide means for drawing or dragging the cooked batch of meat from one end of the stove to the other end where it is maintained in reserve and in convenient position for access during the making of sandwiches and also to provide for dividing the pan into separate chambers for containing a cooked batch and a cooking batch and especially to provide a partition which is shiftable from place to place along the pan. This is accomplished by a transversely disposed partition member 20 whose lower edge engages the bottom of the pan and whose upper part is hingedly mounted on a transverse pivot bar 21 which has its ends mounted in brackets 22. These brackets are designed to be shifted along the top of the pan from position to position and frictionally held at selected positions to support the transverse partition 20 at the desired location.

The bracket is shown as having outwardly deflected shoe ends 23 springing frictionally against the side walls of the pan and also have out-turned ledges 24 slidably bearing and shiftable on the inner corners of the pan frame 9. The end heads of the pivot 21 which carries the partition 20 clinch over the brackets 21 but are clear of the walls of the pan. The upper part of the partition 20 is provided with a hand-hole 25 for convenience of adjustment.

The lower or right hand end of the stove pan is utilized for the cooking portion and in operation after a batch of meat has been cooked to the desired degree the partition 20 is shifted over to the end wall at the lower end and the cooked batch is then drawn up, using the partition as a scraper, to the upper end of the pan which is maintained at a suitable degree of temperature to keep the cooked batch hot. It will be seen that the partition will serve to separate the cooked from the uncooked batch and either of the lids 17 may be lowered to keep the heat in either end at which the partition may be adjusted.

What is claimed is:

1. A stove for cooking Hamburger sandwich meats comprising an interior pan having an inclined bottom, and an adjustable transverse partition forming a scoop whereby to scrape the batch from the lower cooking end upward to the upper hot-spot end.

2. A stove for cooking Hamburger sandwich meats comprising an interior pan having an inclined bottom, and an adjustable transverse partition forming a scoop whereby to scrape the batch from the lower cooking end upward to the upper hot-spot end; said partition being pivoted on a sliding carrier.

3. A stove for cooking Hamburger sandwich meats comprising an interior pan having an inclined bottom, and an adjustable transverse partition forming a scoop whereby to scrape the batch from the lower cooking end upward to the upper hot-spot end; said partition being pivoted on a sliding carrier; said carrier including friction brackets engaging side walls of the pan.

4. A stove for cooking Hamburger sandwich meats comprising an interior pan having an inclined bottom, and an adjustable transverse partition forming a scoop whereby to scrape the batch from the lower cooking end upward to the upper hot-spot end; said partition being pivoted on a sliding carrier; said carrier including friction brackets engaging side walls of the pan and having riding ledges resting on the pan rim.

5. In combination, a Hamburger sandwich meat cooking stove having a pan, and a detachable partition having sliding brackets resting on and adjustable along the rim of the pan; said partition forming a scoop to draw along the cooked meat and to divide the cooked and uncooked batches.

6. A stove, for cooking Hamburger meat batches, including a pan having upright side and end walls and a flat bottom, and a movable partition fitting the side walls and dragging on the bottom, whereby to draw the cooked meat from the cooking end of the pan.

ROBERT W. RILEY.